(12) United States Patent
Takabatake et al.

(10) Patent No.: US 9,491,344 B2
(45) Date of Patent: *Nov. 8, 2016

(54) LIGHTING DEVICE AND IMAGE CAPTURING SYSTEM

(71) Applicant: PFU LIMITED, Ishikawa (JP)

(72) Inventors: Masanari Takabatake, Ishikawa (JP); Yuki Kasahara, Ishikawa (JP); Masahiko Kobako, Ishikawa (JP)

(73) Assignee: PFU Limited, Ishikawa (JP)

( * ) Notice: Subject to any disclaimer, the term of this patent is extended or adjusted under 35 U.S.C. 154(b) by 124 days.

This patent is subject to a terminal disclaimer.

(21) Appl. No.: 14/072,612

(22) Filed: Nov. 5, 2013

(65) Prior Publication Data

US 2014/0160345 A1    Jun. 12, 2014

(30) Foreign Application Priority Data

Dec. 7, 2012    (JP) ................................ 2012-268818

(51) Int. Cl.
| | |
|---|---|
| *H04N 5/225* | (2006.01) |
| *F16M 11/22* | (2006.01) |
| *F16M 13/00* | (2006.01) |
| *G03B 15/02* | (2006.01) |
| *G03B 17/56* | (2006.01) |

(52) U.S. Cl.
CPC ............ *H04N 5/2256* (2013.01); *F16M 11/22* (2013.01); *F16M 13/00* (2013.01); *G03B 15/02* (2013.01); *G03B 17/561* (2013.01); *H04N 5/2251* (2013.01); *H04N 5/2253* (2013.01); *F16M 2200/08* (2013.01); *G03B 2215/0567* (2013.01)

(58) Field of Classification Search
None
See application file for complete search history.

(56) References Cited

U.S. PATENT DOCUMENTS

| | | | | |
|---|---|---|---|---|
| 5,084,611 | A | | 1/1992 | Okisu et al. |
| 5,444,486 | A | * | 8/1995 | Mizuno et al. ............... 348/376 |
| 5,594,502 | A | * | 1/1997 | Bito et al. ..................... 348/373 |
| 5,929,910 | A | * | 7/1999 | Kim ..................... H04N 1/1004 348/222.1 |
| 5,978,028 | A | * | 11/1999 | Yamane ........................ 348/373 |
| 6,317,155 | B1 | * | 11/2001 | Ohyama ....................... 348/373 |
| 6,540,415 | B1 | | 4/2003 | Slatter et al. |

(Continued)

FOREIGN PATENT DOCUMENTS

| | | |
|---|---|---|
| CN | 101171544 A | 4/2008 |
| CN | 201489650 U | 5/2010 |

(Continued)

OTHER PUBLICATIONS

U.S. Office Action issued in U.S. Appl. No. 14/183,185 dated Jun. 20, 2014.

(Continued)

*Primary Examiner* — Michael Osinski
(74) *Attorney, Agent, or Firm* — McDermott Will & Emery LLP

(57) ABSTRACT

In an image capturing system, a lighting device includes a base disposed on a medium setting surface on which a medium serving as a reading target is set, an arm extending upward from the base, a top unit extending from the arm in such a manner that the top unit faces the medium setting surface, a placement surface that is provided to the top unit and on which a smartphone (imaging unit) is placed at a position allowing the smartphone to photograph the medium set on the medium setting surface, and a lighting LED that is provided to the top unit and irradiates the medium setting surface.

11 Claims, 8 Drawing Sheets

(56) References Cited

U.S. PATENT DOCUMENTS

| | | | |
|---|---|---|---|
| 7,626,634 B2 * | 12/2009 | Ohki et al. | 348/373 |
| 7,706,673 B1 * | 4/2010 | Staudinger | F16M 11/06 348/211.2 |
| 8,553,090 B2 * | 10/2013 | Shiu et al. | 348/207.99 |
| 8,559,063 B1 | 10/2013 | Booppanon et al. | |
| 8,767,056 B2 * | 7/2014 | Carpenter | 348/61 |
| 8,781,311 B1 * | 7/2014 | Hatzav et al. | 396/5 |
| D714,775 S * | 10/2014 | Yoo et al. | D14/253 |
| 2003/0025951 A1 | 2/2003 | Pollard et al. | |
| 2003/0081014 A1 | 5/2003 | Frohlich | |
| 2003/0095200 A1 * | 5/2003 | Nagano | H04N 1/195 348/373 |
| 2003/0202224 A1 * | 10/2003 | Moriya | F21S 6/002 358/475 |
| 2004/0233325 A1 * | 11/2004 | Lee et al. | 348/375 |
| 2005/0040298 A1 * | 2/2005 | Ohki et al. | 248/176.1 |
| 2005/0088543 A1 * | 4/2005 | Yoshii | 348/239 |
| 2005/0168627 A1 * | 8/2005 | Yi et al. | 348/373 |
| 2005/0174473 A1 | 8/2005 | Morgan et al. | |
| 2006/0045379 A1 * | 3/2006 | Heaney et al. | 382/276 |
| 2006/0077286 A1 * | 4/2006 | Wenderski | 348/373 |
| 2006/0110152 A1 * | 5/2006 | Sukenari et al. | 396/155 |
| 2007/0035655 A1 * | 2/2007 | Chen et al. | 348/373 |
| 2007/0188830 A1 | 8/2007 | Watanuki | |
| 2007/0213590 A1 | 9/2007 | Squicciarini | |
| 2008/0062263 A1 * | 3/2008 | Shiu et al. | 348/96 |
| 2009/0002548 A1 | 1/2009 | Liang et al. | |
| 2009/0093274 A1 | 4/2009 | Yamamoto | |
| 2009/0202236 A1 | 8/2009 | Hama et al. | |
| 2010/0321561 A1 * | 12/2010 | Duncan et al. | 348/373 |
| 2011/0157376 A1 | 6/2011 | Lyu et al. | |
| 2011/0288964 A1 | 11/2011 | Linder et al. | |
| 2012/0169888 A1 * | 7/2012 | Clark | 348/207.1 |
| 2012/0230056 A1 | 9/2012 | Hanaoka et al. | |
| 2012/0320262 A1 | 12/2012 | Chung | |
| 2014/0037296 A1 | 2/2014 | Yamada et al. | |
| 2014/0055990 A1 | 2/2014 | Reed | |
| 2014/0160345 A1 | 6/2014 | Takabatake et al. | |
| 2014/0160350 A1 * | 6/2014 | Takabatake et al. | 348/376 |
| 2014/0168506 A1 * | 6/2014 | Kasahara | 348/370 |
| 2015/0117849 A1 * | 4/2015 | Kasahara et al. | 396/164 |
| 2015/0138432 A1 * | 5/2015 | Takabatake et al. | 348/370 |
| 2015/0181072 A1 * | 6/2015 | Kasahara et al. | 348/376 |

FOREIGN PATENT DOCUMENTS

| | | |
|---|---|---|
| CN | 202221508 U | 5/2012 |
| EP | 0138115 A1 | 4/1985 |
| JP | H04-018533 A | 1/1992 |
| JP | H04-123674 A | 4/1992 |
| JP | 07-236081 A | 9/1995 |
| JP | H09-205567 A | 8/1997 |
| JP | H09-233373 A | 9/1997 |
| JP | H11-295809 A | 10/1999 |
| JP | 2002-135638 A | 5/2002 |
| JP | 2002-372743 A | 12/2002 |
| JP | 2005-003813 A | 1/2005 |
| JP | 2005-99708 A | 4/2005 |
| JP | 2005-141185 A | 6/2005 |
| JP | 2006-208857 A | 8/2006 |
| JP | 2006-251113 A | 9/2006 |
| JP | 3129571 U | 3/2007 |
| JP | 2007-101663 A | 4/2007 |
| JP | 2009-253712 A | 10/2009 |
| JP | 2012-124582 A | 6/2012 |

OTHER PUBLICATIONS

Kazuhiro Ikeda et al., "Reading Lamp that can Scan Books: LED Desk Lamp with Internal Camera", http://gadget.itmedia.co.jp/gg/articles/1201/20/news127.html with English translation.

Non-Final Office Action U.S. Appl. No. 14/072,558 dated Dec. 5, 2014.

Non-Final Office Action U.S. Appl. No. 14/072,655 dated Dec. 5, 2014.

Final Office Action U.S. Appl. No. 14/183,185 dated Jan. 22, 2015.

Non-Final Office Action Japanese Patent Application No. 14/183,185 dated May 22, 2015.

Final Office Action U.S. Appl. No. 14/072,655 dated Jun. 15, 2015.

Final Office Action Japanese Patent Application No. 14/072,558 dated Jun. 15, 2015.

Chinese Office Action issued in Application No. 201310660560.5 dated Mar. 24, 2016.

Japanese Office Action issued in Application No. 2012-268818 dated Apr. 26, 2016, with English translation.

\* cited by examiner

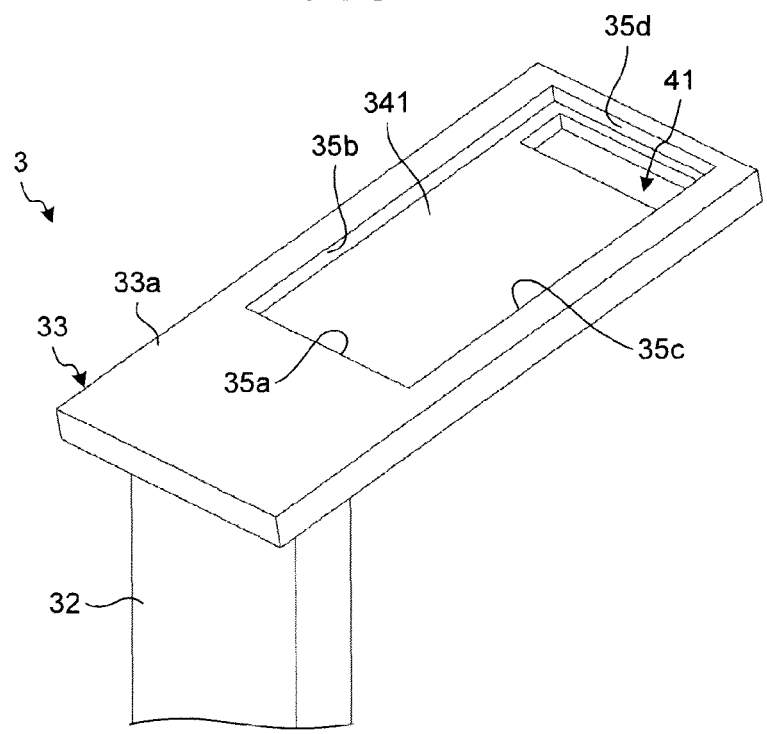
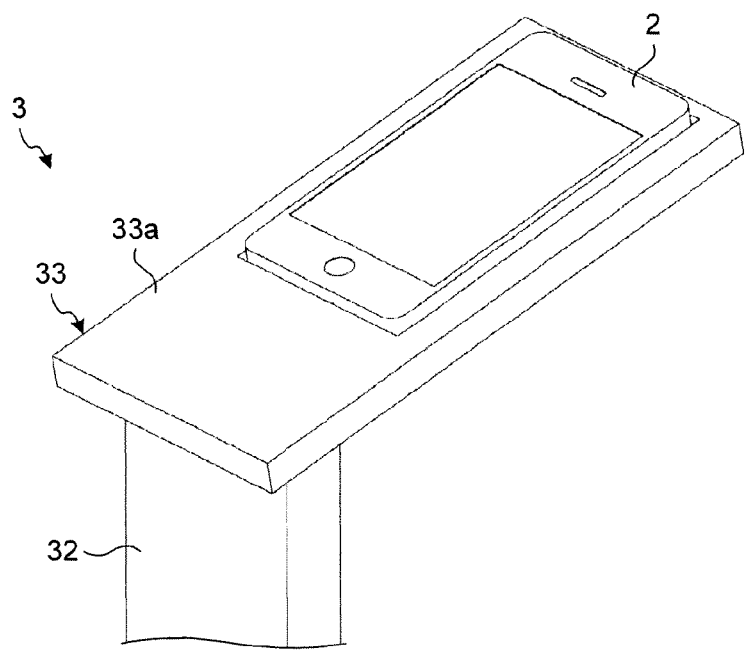

LIGHTING DEVICE AND IMAGE CAPTURING SYSTEM

CROSS-REFERENCE TO RELATED APPLICATIONS

This application is based upon and claims the benefit of priority from Japanese Patent Application No. 2012-268818, filed on Dec. 7, 2012, the entire contents of which are incorporated herein by reference.

BACKGROUND OF THE INVENTION

1. Field of the Invention

The present invention relates to a lighting device and an image capturing system.

2. Description of the Related Art

Mobile terminals, such as cellular phones and smartphones, having camera functions have been widely distributed (e.g., refer to Japanese Patent Application Laid-open No. 2012-124582). There are needs to perform scanning operation that images desired media such as books, magazines, and documents and acquires image data using mobile imaging units such as the camera functions of the mobile terminals. Depending on the types of imaging units, lightings included in the imaging units fail to provide a sufficient amount of light to a medium serving as a reading target in some cases. In such cases, imaging may be performed by substituting desk lights for the lightings, for example.

To improve the quality of scanned images in scanning operation, uniform luminance is preferably achieved on the whole of a photographing area. The use of a separate lighting device such as a desk light as a substitute for the imaging unit makes it difficult to uniformly irradiate the whole of the photographing area with light in some cases because it is difficult to uniquely fix the positional relation between the imaging unit and the lighting device. The conventional techniques thus have room for improvement to simply and reliably perform the scanning operation by the mobile imaging units.

SUMMARY OF THE INVENTION

It is an object of the present invention to at least partially solve the problems in the conventional technology. According to an aspect of the present invention, a lighting device comprises a base that is disposed on a medium setting surface on which a medium serving as a reading target is set, an arm that extends upward from the base, a top unit that extends from the arm in such a manner that the top unit faces the medium setting surface, a placement surface that is provided to the top unit and on which an imaging unit is placed at a position allowing the imaging unit to photograph the medium set on the medium setting surface, and a lighting that is provided to the top unit and irradiates the medium setting surface.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a perspective view illustrating a schematic structure of a top unit and a placement surface of the lighting device according to a first modification of the embodiment;

FIG. 8 is a perspective view illustrating a state where a smartphone is placed on the placement surface illustrated in FIG. 7;

DETAILED DESCRIPTION OF THE PREFERRED EMBODIMENT

Figure 1:
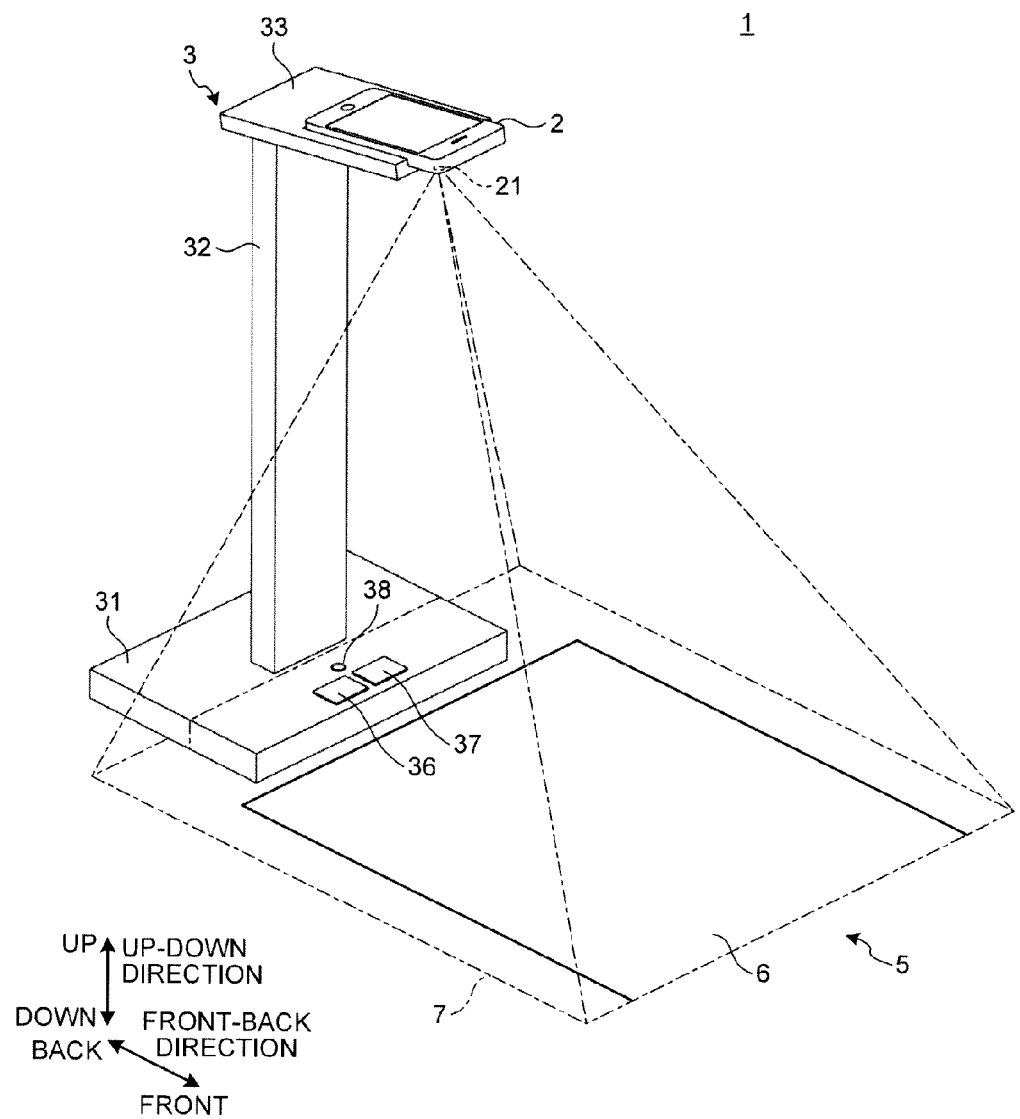
FIG. 1 is a perspective view illustrating a schematic structure of an image capturing system according to an embodiment of the invention.

An embodiment of a lighting device and an image capturing system according to the invention is described below with reference to the accompanying drawings. In the drawings, the same or corresponding portions are labeled with the same reference numerals and duplicated description thereof is omitted.

Embodiment

Figure 2:
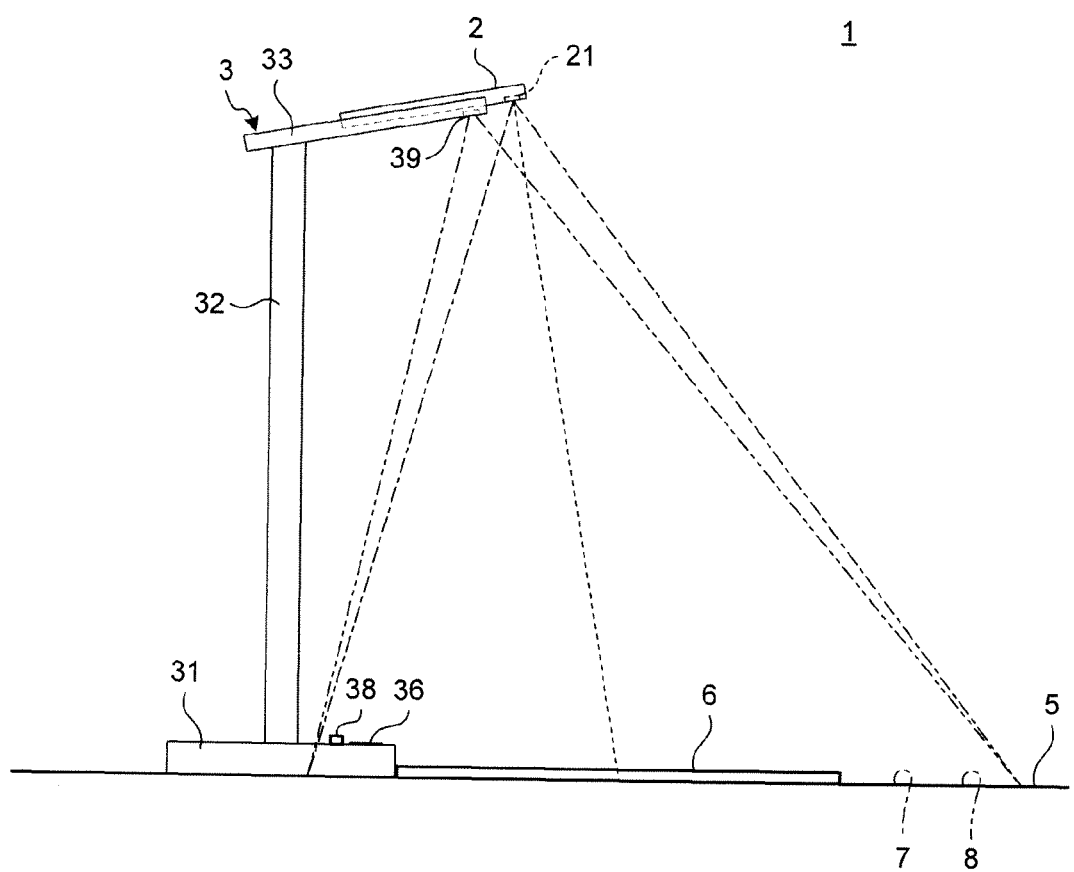
FIG. 2 is a side view of the image capturing system illustrated in FIG. 1.
Figure 3:
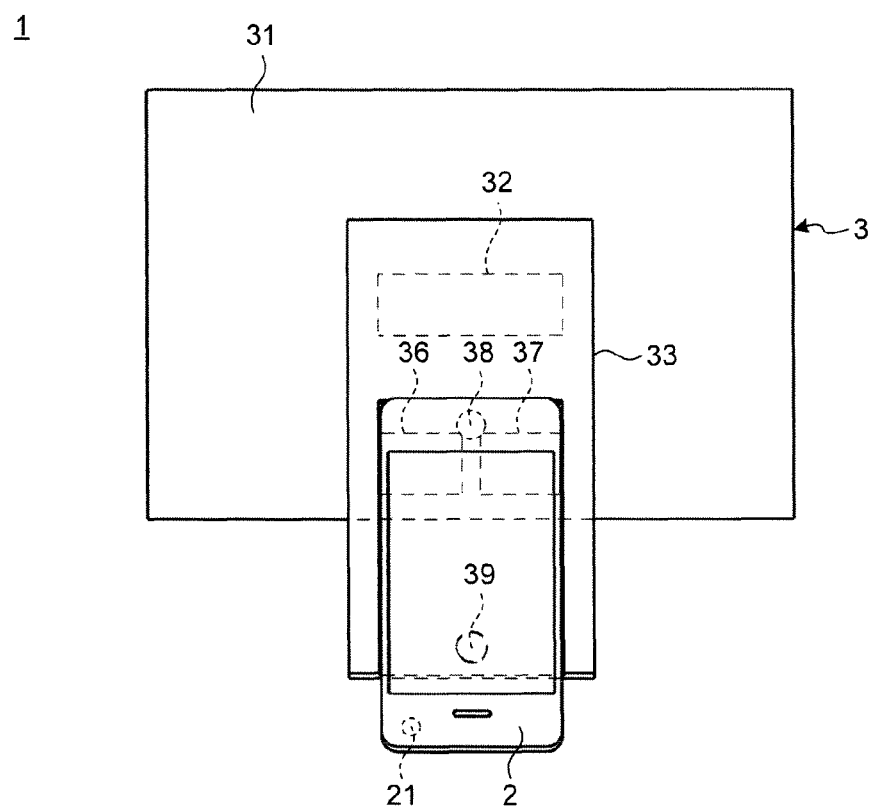
FIG. 3 is a top view of the image capturing system illustrated in FIG. 1.
Figure 4:
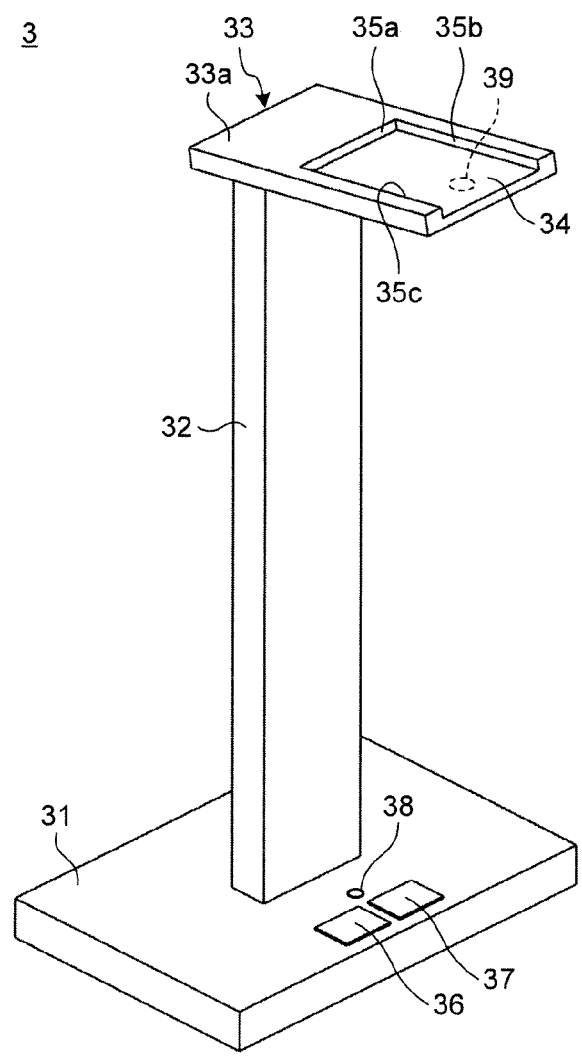
FIG. 4 is a perspective view of a lighting device in FIG. 1.
Figure 5:
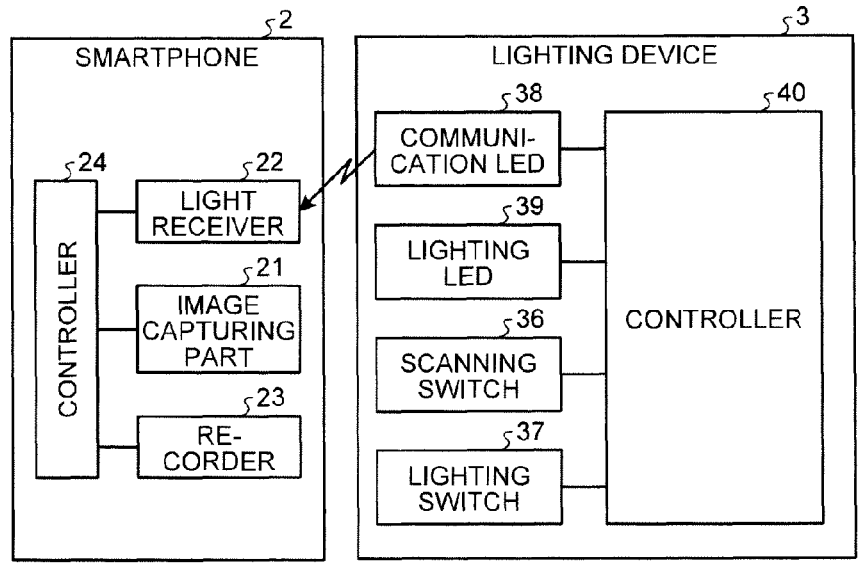
FIG. 5 is a functional block diagram of the image capturing system illustrated in FIG. 1.

The structure of an image capturing system according to the embodiment is described with reference to FIGS. 1 to 5. FIG. 1 is a perspective view illustrating a schematic structure of the image capturing system in the embodiment. FIG. 2 is a side view of the image capturing system illustrated in FIG. 1. FIG. 3 is a top view of the image capturing system illustrated in FIG. 1. FIG. 4 is a perspective view of a mounting stand for imaging in FIG. 1. FIG. 5 is a functional block diagram of the image capturing system illustrated in FIG. 1.

This image capturing system 1 is a scanning system that performs scanning operation to generate image data of a medium 6, which is set on a medium setting surface 5 as a reading target, by capturing image of the medium 6 by a predetermined imaging unit from above. In the embodiment, the description is made with a smartphone 2 having a camera function as an example of the imaging unit.

As illustrated in FIGS. 1 to 3, the image capturing system 1 includes the smartphone 2 and a lighting device 3 on which the smartphone 2 is placed when the smartphone 2 performs the scanning operation (here, "scanning operation" means photographing a predetermined area 7 to be photographed, hereinafter, photographed area 7, as described in the specification later). The image capturing system 1 acquires a scanned image (i.e., a photographed image) of the predetermined photographed area 7, by the smartphone 2 when the smartphone 2 is placed at a predetermined position of the lighting device 3 (i.e. on a placement surface 34, which is described later) and is precisely positioned. In the following description, the up-down direction in FIG. 1 is defined as the up-down direction of the image capturing system 1 and the lighting device 3. With respect to the image capturing system 1, specifically, with respect to a base 31, as disclosed in FIG. 1, a side facing the medium 6 is defined as the front side of the image capturing system 1 and the lighting device 3, and an opposite side to the front side is defined as the back side of the image capturing system 1 and the lighting device 3. A direction from the back side of the image capturing system 1 toward the front side of the image capturing system 1 is defined as a front direction, and a direction opposite to the front direction is defined as a back direction.

The smartphone 2 is provided with an image capturing part 21 relating to the camera function on the rear surface thereof. The image capturing part 21 executes the scanning operation in accordance with an operation command from a controller 24 (refer to FIG. 3) of the smartphone 2. The image capturing part 21 images the whole of the predetermined photographed area 7 and generates a scanned image including the whole of the imaging area 7 in the state where the smartphone 2 is placed on the placement surface 34 of the mounting stand 3.

The lighting device 3 includes three members of a base 31, an arm 32, and a top unit 33. The base 31 is disposed on the medium setting surface 5. The arm 32 is connected to the upper surface of the base and extends upward from the base 31. The extending direction of the arm 32 may be the vertically upward direction as illustrated in FIGS. 1 to 4, or may be slanted to the front side (on the side where the medium 6 is set) from the vertically upward direction or to the back side (on the side opposite the side where the medium 6 is set) from the vertically upward direction.

The top unit 33 is connected to the arm 32 and extends from the arm 32 such that the top unit 33 faces the medium setting surface 5. In the embodiment, as illustrated in FIG. 2, the top unit 33 is connected to an upper end of the arm 32 and extends forward from a position at which the top unit 33 is connected to the arm 32 so as to incline obliquely upward from the horizontal direction.

The base 31, the arm 32, and the top unit 33 of the lighting device 3 are integrally fixed to each other. In other words, the connecting portion of the base 31 and the arm 32 and the connecting portion of the arm 32 and the top unit 33 are fixedly provided so as not to be deformed such as being rotated, removed, or moved.

As illustrated in FIG. 4, the placement surface 34 is provided on an upper surface 33*a* of the top unit 33 of the lighting device 3 to place the smartphone 2 thereon at a position enabling the smartphone 2 to image the medium 6 set on the medium setting surface 5.

The placement surface 34 is formed by being recessed from the upper surface 33*a*. The placement surface 34 is provided such that part of the rear surface of the smartphone 2 in the longitudinal direction projects from the front edge of the top unit 33 when the smartphone 2 is placed on the placement surface 34. In other words, the placement surface 34 is formed backward from the front edge of the top unit 33 (in a direction toward the arm 32) and the area of the placement surface 34 is smaller than that of the rear surface of the smartphone 2. In addition, the length of the placement surface 34 in the front-back direction is smaller than that of the smartphone 2 in the longitudinal direction. As a result, the smartphone 2 is placed on the placement surface 34 such that the image capturing part 21 provided on the rear surface of the smartphone 2 is not covered by the placement surface 34. In other words, the image capturing part 21 is positioned directly facing the medium setting surface 5 when the smartphone 2 is placed on the placement surface 34, thereby making it possible to image the medium 6 on the medium setting surface 5. The placement surface 34 thus formed allows the smartphone 2 to be readily placed on or removed from the placement surface 34 (smooth mounting and dismounting of the smartphone 2).

A step is formed between the upper surface 33*a* of the top unit 33 and the placement surface 34. More specifically, a step 35*a* abutting the lower portion of the smartphone 2 in the longitudinal direction, and steps 35*b* and 35*c* abutting the left and right side surfaces, respectively, of the smartphone 2 are provided. Namely, the steps 35*a*, 35*b*, and 35*c* are provided so as to abut the smartphone 2 from three directions. The steps 35*a* and 35*b* are connected at an approximately right angle, the steps 35*a* and 35*c* are connected at an approximately right angle, and the steps 35*b* and 35*c* are disposed in parallel in the front-back direction. The smartphone 2 can be positioned at a predetermined position by being abutted to the steps 35*a*, 35*b*, and 35*c*. That is, the steps 35*a*, 35*b*, and 35*c* formed between the upper surface 33*a* of the top unit 33 and the placement surface 34 function as a positioning unit that positions the smartphone 2 at a predetermined position on the placement surface 34.

Therefore, when the smartphone 2 is placed on the placement surface 34, it is possible to readily position and place the smartphone 2 at a predetermined position on the placement surface 34 simply by abutting the lower portion of the smartphone 2 in the longitudinal direction to the step 35*a* when the smartphone 2 is placed on the placement surface 34. In addition, the placement surface 34 is inclined downward in the horizontal direction from the front side to the back side of the top unit 33 because the top unit 33 is inclined as described above. That is, since the top unit 33 is connected to an upper end of the arm 32 and extends forward from a position at which the top unit 33 is connected to the arm 32 so as to incline obliquely upward from the horizontal direction, the placement surface 34 is inclined downward in the horizontal direction from the front side to the back side of the top unit 33 when viewed from the front side of the placement surface 34. This allows the smartphone 2 to be readily abutted to the step 35*a*.

The setting position of the placement surface 34 is set such that a distance is kept between the image capturing part 21 of the smartphone 2 and the medium setting surface 5 so as to enable the image capturing part 21 to photograph the whole of the predetermined photographed area 7 located below the image capturing part 21 when the smartphone 2 is placed on the placement surface 34.

A scanning switch 36, a lighting switch 37, and a communication LED 38 (a light source) are provided on the upper surface of the base 31 of the lighting device 3. A lighting LED 39 is provided on the lower surface, which faces the medium setting surface 5, of the top unit 33 of the mounting stand 3. As illustrated in FIG. 5, the scanning switch 36, the lighting switch 37, the communication LED 38, and the lighting LED 39 are electrically connected to a controller 40 provided inside the lighting device 3.

The scanning switch 36 is an input unit that receives instruction for the scanning operation to cause the smartphone 2 to execute the scanning operation from a user. When the scanning switch 36 is depressed, the controller 40 of the lighting device 3 causes the communication LED 38 to output an optical signal to cause the smartphone 2 to start the scanning operation. That is, the optical signal output from the communication LED 38 is an imaging starting trigger to the smartphone 2 placed on the placement surface 34. An infrared LED may be used for the communication LED 38 so that invisible optical signal prevents the user from feeling uncomfortable.

In accordance with the switching on or off of the lighting switch 37, the controller 40 turns on or off the lighting LED 39. The lighting LED 39 functions as a lighting unit lighting the photographing area during the scanning operation and functions as a light of a desk light, for example, when no scanning operation is performed.

As illustrated in FIG. 5, the smartphone 2 includes the image capturing part 21, a light receiver 22, a storage 23, and the controller 24. The image capturing part 21, the light receiver 22, and the storage 23 are electrically connected to the controller 24.

The light receiver 22 detects an optical signal in the photographing area of the image capturing part 21. The light receiver 22 receives the optical signal transmitted from the communication LED 38 in the predetermined photographed area 7 in the state where the smartphone 2 is placed on the placement surface 34. As illustrated in FIG. 1, the photographed area 7 by the smartphone 2 placed on the placement surface 34 is set such that it includes an area adjacent to the front side of the base 31 of the lighting device 3 where the medium 6 is arranged, and the front portion of the base 31 where the communication LED 38 is included. In addition, as illustrated in FIG. 2, the photographed area 7 by the smartphone 2 and an irradiation range 8 of the lighting LED 39 are nearly equal and the lighting LED 39 evenly lights the photographed area 7.

The light receiver 22 monitors the photographed area 7 using the image capturing part 21 and detects the optical signal of the communication LED 38 by analyzing image data captured by the image capturing part 21. The light receiver 22 may be also constituted by sensors other than the image capturing part 21. The storage 23 is a storage device that stores therein read data acquired by the image capturing part 21.

Figure 6:
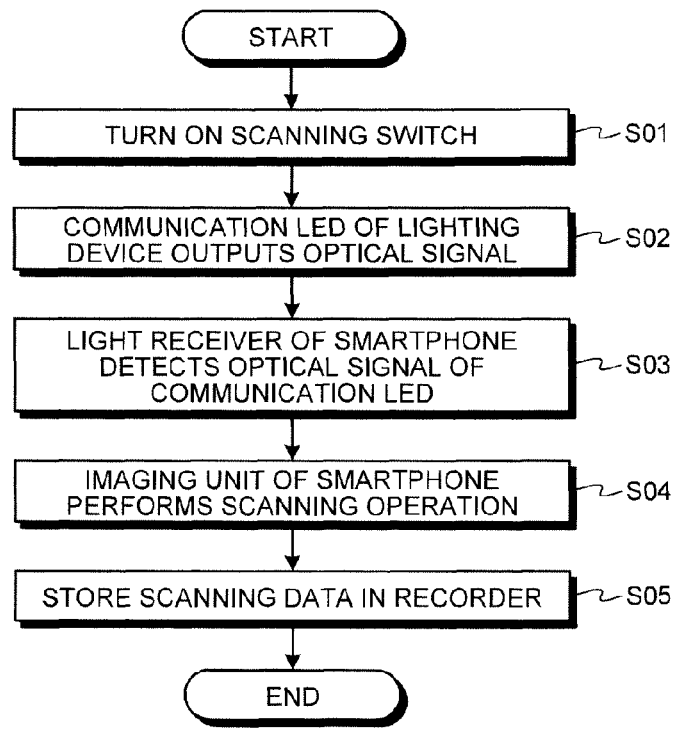
FIG. 6 is a flowchart illustrating medium photographing processing performed by the image capturing system of the embodiment.

The operation of the image capturing system in the embodiment is described below with reference to FIG. 6. FIG. 6 is a flowchart illustrating medium photographing processing performed by the image capturing system in the embodiment.

When a user performs an operation of turning on the scanning switch 36 at the lighting device 3, this operation is input to the controller 40 (S01), and the controller 40 performs scanning starting processing. The controller 40 controls the communication LED 38 to output a predetermined optical signal (S02). The optical signal includes a trigger causing the smartphone 2 to start the scanning operation. Specifically, the optical signal can be provided as a blinking pattern by switching on and off, a high-and-low pattern of light intensity, a change in color, or a change in light-emitting position, for example.

The light receiver 22 of the smartphone 2 detects the optical signal output from the communication LED 38 of the lighting device 3 (S03). The light receiver 22 monitors the photographed area 7 using the image capturing part 21 and extracts the optical signal from the monitored image acquired by the image capturing part 21. The light receiver 22 notifies the controller 24 of the detection of the optical signal including the starting trigger of the scanning operation.

When the optical signal is detected, the controller 24 starts the scanning operation. The controller 24 causes the image capturing part 21 to operate and then the image capturing part 21 performs the scanning operation (S04). The image capturing part 21 is disposed inclined as described before with respect to the medium setting surface 5, the captured image acquired by the image capturing part 21 has a distortion, e.g., such that the image is long in a lateral direction, i.e., a direction perpendicular to the front-back direction, on the base 31 side and short in the lateral direction on the side opposite the base 31 side. The controller 24 corrects the distortion of the captured image by performing projective transformation on the image data captured by the image capturing part 21. The image data after the distortion is corrected is stored in the storage 23 of the smartphone 2 (S05).

The effects of the image capturing system in the embodiment are described below.

In the image capturing system 1 of the embodiment, the lighting device 3 includes the base 31 disposed on the medium setting surface 5 on which the medium 6 serving as a reading target is set, the arm 32 extending upward from the base 31, the top unit 33 extending from the arm 32 in such a manner that the top unit 33 faces the medium setting surface 5, the placement surface 34 that is provided to the top unit 33 to place the smartphone 2 (imaging unit) at a position enabling the smartphone 2 to image the medium 6 set on the medium setting surface 5, and the lighting LED 39 that is provided to the top unit 33 to irradiate the medium setting surface 5.

Due to this structure, since the lighting device 3, which lights the photographed area 7 during the scanning operation, is provided with the placement surface 34 at the top unit 33 thereof to place the smartphone 2 thereon, the positional relation between the image capturing unit 21 of the smartphone 2 and the irradiating range 8 of the lighting LED 39 is unambiguously determined by placing the smartphone 2 on the placement surface 34 of the lighting device 3. This facilitates to dispose the lighting LED 39 such that uniform luminance is available across the entire photographed area 7 by the smartphone 2. Consequently, the scanning operation of the smartphone 2 (imaging unit) is performed consistently under the same condition simply by placing the smartphone 2 on the placement surface 34 of the lighting device 3, thereby making it possible to simply and reliably perform the scanning operation by the smartphone 2.

In the embodiment, the base 31, the arm 32, and the top unit 33 of the lighting device 3 are integrally fixed with each other.

Due to this structure, the position of the placement surface 34 becomes consistently constant relative to the medium setting surface 5 on which the base 31 is disposed. That is, the distance between the image capturing part 21 of the smartphone 2 and the medium setting surface 5 is kept constant just by placing the smartphone 2 on the placement surface 34 of the lighting device 3. Therefore, the image capturing part 21 is disposed at a position where the image capturing part 21 can photograph the whole of the predetermined photographed area 7 on the medium setting surface 5. Consequently, the scanning operation of the smartphone 2 (imaging unit) is performed consistently under the same condition, thereby making it possible to simply and reliably perform the scanning operation by the smartphone 2.

The lighting device 3 of the embodiment has the positioning unit that positions the smartphone 2 at a predetermined position on the placement surface 34. More specifically, the placement surface 34 is provided by being recessed from the upper surface 33a of the top unit 33 such that part of the smartphone 2 projects from the front edge of the top unit 33 when the smartphone 2 is placed on the placement surface 34. The positioning unit includes, specifically, the steps 35a, 35b, and 35c formed between the upper surface 33a and the placement surface 34 of the top unit 33.

This structure makes it possible to position the smartphone 2 at the predetermined position on the placement surface 34 simply by abutting the smartphone 2 to the step 35a, thereby making it possible to readily position the smartphone 2 on the placement surface 34. The placement surface 34 thus formed allows the smartphone 2 to be readily placed on or removed from the placement surface 34 (smooth mounting and dismounting of the smartphone 2).

In the lighting device 3 of the embodiment, the placement surface 34 is provided inclined downward from the front edge of the top unit 33 toward the arm 32. This structure allows the smartphone 2 to be readily abutted to the step 35a, thereby making it possible to more readily place and position the smartphone 2 on the placement surface 34.

The lighting device 3 of the embodiment includes a trigger transmission unit that transmits the imaging starting trigger to the smartphone 2 placed on the placement surface 34. More specifically, the communication LED 38 is provided to the base 31 of the lighting device 3. The imaging range of the smartphone 2 placed on the placement surface 34 includes the communication LED 38. The imaging starting trigger is, specifically, the optical signal output from the communication LED 38.

This structure allows the smartphone 2 placed on the placement surface 34 to receive the trigger to start the scanning operation from the lighting device 3 using the image information acquired by the image capturing part 21. As a result, the smartphone 2 is not required to be electrically connected to the lighting device 3. Consequently, the scanning operation by the smartphone 2 is achieved by a simple structure.

First Modification of the Embodiment

A first modification of the embodiment is described below with reference to FIGS. 7 and 8. FIG. 7 is a perspective view illustrating a schematic structure of the top unit and the placement surface of the lighting device in the first modification of the embodiment. FIG. 8 is a perspective view illustrating a state where the smartphone is placed on the placement surface illustrated in FIG. 7.

As illustrated in FIGS. 7 and 8, a placement surface 341 of the lighting device 3 may be provided by being recessed from the upper surface 33a of the top unit 33 according to the circumferential shape of the smartphone 2. In this structure, unlike the placement surface 34 of the above-described embodiment, the area of the placement surface 341 is nearly equal to the area of the rear surface of the smartphone 2 and the shape of the placement surface 341 is the same as the rear surface shape of the smartphone 2. A step is formed between the upper surface 33a of the top unit 33 and the placement surface 341 on the front edge side of the top unit 33 (illustrated as a step 35d in FIG. 7) in addition to the steps 35a to 35c in the above-described embodiment.

Further, an opening 41, which communicates with the lower surface of the top unit 33, is formed on the placement surface 341. The opening is formed at an area where the image capturing part 21 is disposed when the smartphone 2 is placed on the placement surface 341 so as to enable the image capturing part 21 to view the medium setting surface 5 while the smartphone 2 is placed on the placement surface 341, i.e., so as to enable the image capturing part 21 to image the photographed area 7 of the medium setting surface 5.

This structure causes the side surface of the smartphone 2 to abut, with the whole circumference, the steps 35a to 35d when the smartphone 2 is placed on the placement surface 341, thereby making it possible to reliably position and place the smartphone 2 at a predetermined position on the placement surface 341.

Second Modification of the Embodiment

Figure 9:
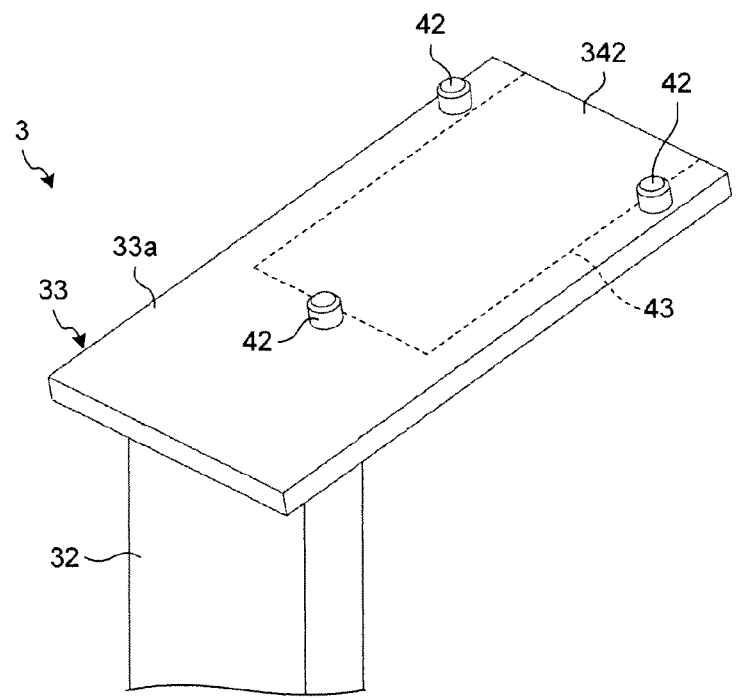
FIG. 9 is a perspective view illustrating a schematic structure of the top unit and the placement surface of the lighting device according to a second modification of the embodiment.
Figure 10:
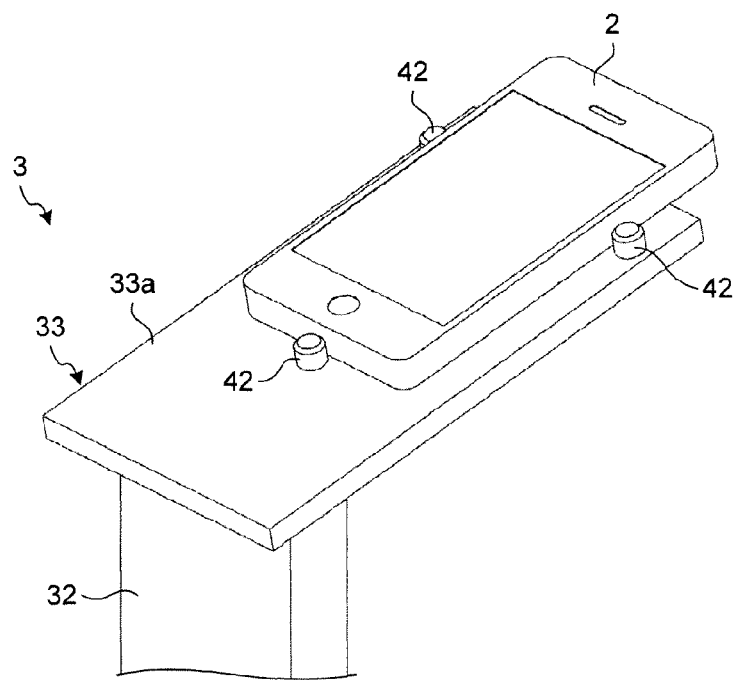
FIG. 10 is a perspective view illustrating a state where the smartphone is placed on the placement surface illustrated in FIG. 9.

A second modification of the embodiment is described below with reference to FIGS. 9 and 10. FIG. 9 is a perspective view illustrating a schematic structure of the top unit and the placement surface of the lighting device in the second modification of the embodiment. FIG. 10 is a perspective view illustrating a state where the smartphone is placed on the placement surface illustrated in FIG. 9.

As illustrated in FIGS. 9 and 10, a placement surface 342 of the lighting device 3 may be formed on the same plane as the upper surface 33a of the top unit 33 and a plurality of projections 42 may be arranged around a boundary 43 between the placement surface 342 and the upper surface 33a. The projections 42 are formed at positions abutting the smartphone 2 when the smartphone 2 is placed on the placement surface 342. As illustrated in FIG. 10, when the smartphone 2 is placed, the respective projections 42 abut the corresponding respective side surfaces of the smartphone 2, thereby positioning the smartphone 2.

This structure makes it possible to form the placement surface 342 simply by arranging the projections 42 on the upper surface 33a without being recessed from the upper surface 33a of the top unit 33, thereby reducing manufacturing cost.

In the example illustrated in FIGS. 9 and 10, the placement surface 342 is provided at such a position that the image capturing part 21 of the smartphone 2 projects from the front edge of the top unit. Another structure may be applicable in which four projections 42 are arranged such that they are capable of making contact with the corresponding four side surfaces of the smartphone 2, and the whole circumference of the smartphone 2 is placed on the upper surface 33a of the top unit in the same manner as the first modification, for example.

Third Modification of the Embodiment

Figure 11:
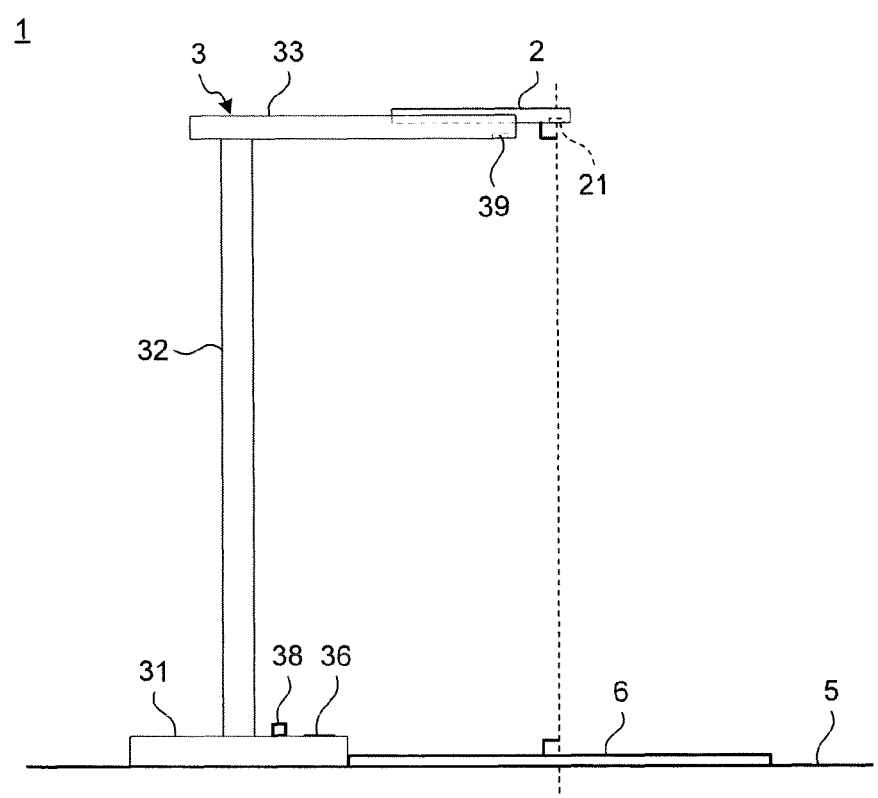
FIG. 11 is a side view of the lighting device according to a third modification of the embodiment.

A third modification of the embodiment is described below with reference to FIG. 11. FIG. 11 is a side view of the lighting device in the third modification of the embodiment.

As illustrated in FIG. 11, the placement surface 34 may be provided such that the imaging surface of the smartphone 2 placed on the placement surface 34 and the medium setting surface 5 are in parallel with each other. That is, the smartphone 2 is positioned such that the optical axis of the image capturing part 21 of the smartphone 2 is perpendicular to the medium setting surface 5. In other words, the placement surface 34 is formed on the top unit 33 of the mounting stand 3 such that it is in parallel with the medium setting surface 5.

This structure prevents the occurrence of distortion in images taken by the image capturing part 21, resulting in no need for post-processing of the captured images such as projective transformation. As a result, the processing speed of the scanning operation increases and the image deterioration is reduced.

In the embodiment, description is made with the smartphone 2 having a camera function as an example of the imaging unit imaging or photographing the medium serving as a reading target. The invention is applicable to other imaging units such as digital cameras, personal digital assistants (PDAs), cellular phones, notebook computers, and personal handyphone systems (PHSs) having camera functions.

In the embodiment, the optical signal of the communication LED 38 is used as the imaging starting trigger of the scanning operation output from the lighting device 3 to the smartphone 2. Instead, the lighting LED 39 may be configured to transmit the optical signal, and the optical signal transmitted from the LED 39 may be used as the imaging starting trigger.

In the embodiment, the optical signal is used as the imaging starting trigger. Any information that can be detected based on the photographed image of the image capturing part 21 may be used. For example, information other than the optical signal, such as a gesture or sound information, may be also used.

A lighting device and a photographing system of the invention have the advantage of simply and reliably performing the scanning operation with an imaging unit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A lighting device, comprising:
   a base that is disposed on a medium setting surface on which a medium serving as a reading target is set;
   an arm that extends upward from the base;
   a top unit that extends from the arm in such a manner that the top unit faces the medium setting surface;
   a placement surface that is provided to the top unit and on which an imaging unit is placed at a position allowing the imaging unit to photograph the medium set on the medium setting surface;
   a lighting that is provided to the top unit and irradiates the medium setting surface; and
   a trigger transmitting unit that transmits an imaging starting trigger wirelessly to an imaging area of the imaging unit which is placed on the placement surface, the trigger transmitting unit being provided in the base within the imaging area so that the imaging starting trigger as a signal is detectable by the imaging unit.

2. The lighting device according to claim 1, wherein the base, the arm, and the top unit are integrally fixed with each other.

3. The lighting device according to claim 1, further comprising a positioning unit that positions the imaging unit at a predetermined position on the placement surface.

4. The lighting device according to claim 3, wherein
   the placement surface is provided by being recessed from the upper surface of the top unit so as to cause part of the imaging unit to project from the front edge of the top unit when the imaging unit is placed on the placement surface, and
   the positioning unit is a step formed between the upper surface of the top unit and the placement surface.

5. The lighting device according to claim 3, wherein
   the placement surface is provided by being recessed from the upper surface of the top unit according to the circumferential shape of the imaging unit, and
   the positioning unit is a step formed between the upper surface of the top unit and the placement surface.

6. The lighting device according to claim 3, wherein the positioning unit is a plurality of projections that are formed at positions abutting the imaging unit when the imaging unit is placed on the placement surface.

7. The lighting device according to claim 1, wherein the placement surface is provided slanting downward from the front edge of the top unit toward the arm.

8. The lighting device according to claim 1, wherein the placement surface is provided such that an imaging surface of the imaging unit placed on the placement surface and the medium setting surface are in parallel with each other.

9. The lighting device according to claim 1, wherein
   the base includes a light source,
   a photographed area by the imaging unit placed on the placement surface includes the light source, and
   the imaging starting trigger is an optical signal output from the light source.

10. An image capturing system, comprising:
    a lighting device that includes:
    a base that is disposed on a medium setting surface on which a medium serving as a reading target is set;
    an arm that extends upward from the base;
    a top unit that extends from the arm in such a manner that the top unit faces the medium setting surface;
    a placement surface that is provided to the top unit and on which an imaging unit is placed at a position allowing the imaging unit to photograph the medium set on the medium setting surface;
    a lighting that is provided to the top unit and irradiates the medium setting surface; and
    a trigger transmitting unit that transmits an imaging starting trigger wirelessly to an imaging area of the imaging unit which is placed on the placement surface, the trigger transmitting unit being provided in the base within the imaging area so that the imaging starting trigger as a signal is detectable by the imaging unit, and
    the imaging unit that photographs a medium set on the medium setting surface in a state where the imaging unit is placed on the lighting device.

11. A lighting device, comprising:
    a base that is disposed on a medium setting surface on which a medium serving as a reading target is set;
    an arm that extends upward from the base;
    a top unit that extends from the arm in such a manner that the top unit faces the medium setting surface;
    a lighting that is provided to the top unit;
    a placement surface that is provided to the top unit to place an imaging unit thereon at a position allowing the imaging unit to photograph an area, where the medium is to be set, on the medium setting surface, and
    a trigger transmitting unit that transmits an imaging starting trigger wirelessly to an imaging area of the imaging unit which is placed on the placement surface, the trigger transmitting unit being provided in the base within the imaging area so that the imaging starting trigger as a signal is detectable by the imaging unit, wherein
    the lighting irradiates the medium setting surface including the area to be photographed by the imaging unit, and an irradiation range of the lighting is nearly equal to the area to be photographed by the imaging unit.

* * * * *